United States Patent [19]
Satran et al.

[11] Patent Number: 5,727,911
[45] Date of Patent: Mar. 17, 1998

[54] MILLING CUTTING INSERT

[75] Inventors: Amir Satran, Kfar Havradim; Carol Smilovici, Acre, both of Israel

[73] Assignee: Iscar, Ltd., Migdal Tefen, Israel

[21] Appl. No.: 698,186

[22] PCT Filed: Feb. 18, 1994

[86] PCT No.: PCT/EP94/00474

§ 371 Date: Dec. 8, 1994

§ 102(e) Date: Dec. 8, 1994

[87] PCT Pub. No.: WO94/19133

PCT Pub. Date: Sep. 1, 1994

Related U.S. Application Data

[63] Continuation of Ser. No. 318,797, Dec. 8, 1994, abandoned.

[30] Foreign Application Priority Data

Feb. 19, 1993 [IL] Israel .......................... 104800

[51] Int. Cl.6 .......................... B23C 5/02; B23C 5/20
[52] U.S. Cl. .......................... 407/42; 407/113
[58] Field of Search .......................... 407/42, 113, 114

[56] References Cited

U.S. PATENT DOCUMENTS

| | | | |
|---|---|---|---|
| 5,052,863 | 10/1991 | Satran | 407/113 |
| 5,071,292 | 12/1991 | Satran | 407/116 |
| 5,078,550 | 1/1992 | Satran et al. | 407/34 |
| 5,150,992 | 9/1992 | Friedmann | 407/110 |
| 5,158,402 | 10/1992 | Satran et al. | 407/113 |
| 5,232,319 | 8/1993 | Satran et al. | 407/114 |

FOREIGN PATENT DOCUMENTS

| | | |
|---|---|---|
| 0 566 085 A1 | 10/1993 | European Pat. Off. . |
| 2 091 143 | 7/1982 | United Kingdom . |

OTHER PUBLICATIONS

Patent Abstracts of Japan, vol. 9, No. 63 (M-365) (1786) Mar. 20, 1985 and JP,A,59 196 107 (Nihon Yakin) Nov. 7, 1984 (see abstract attached).

Primary Examiner—Daniel W. Howell
Assistant Examiner—Kenneth J. Hansen
Attorney, Agent, or Firm—Pennie & Edmonds, LLP

[57] ABSTRACT

A cutting insert for with a rotary milling cutting tool is disclosed. The insert has a cutting edge defined between a cutting rake surface and a relief flank and a base edge defined between the relief flank and a base surface. The cutting edge comprises a plurality of successive component cutting edges and intermediate edges located between successive component cutting edges. Each component cutting edge has a leading end and a trailing end, and is downwardly inclined from its leading end towards the base edge. Each leading end, other than that belonging to a first leading component cutting edge, is connected to an immediately preceding trailing end via an intermediate edge which rises from the preceding trailing end away from the base edge.

17 Claims, 3 Drawing Sheets

MILLING CUTTING INSERT

This is a continuation of application Ser. No. 08/318,797, filed Dec. 8, 1994, now abandoned.

FIELD OF THE INVENTION

This invention relates to an exchangeable hard metal cutting insert for use with a rotary milling cutter particularly, but not exclusively, for use in milling slots, shoulders or the like, with the side milled surface disposed substantially perpendicular to a milled base surface.

One or more of such inserts are releasably mounted in corresponding peripheral recesses formed in a rotary tool holder, each insert being provided with at least one cutting edge which, when mounted in the tool holder, is operatively disposed for milling operations.

BACKGROUND OF THE INVENTION

It is well known, with such rotary milling cutters, that it is advantageous to position each insert in the cutter so as to present a significantly large, positive axial rake angle.

With known rotary milling cutters such as, for example, that described in our prior U.S. Patent Specification Ser. No. 5,158,402, increasing the axial rake angle of the operative cutting edge on the insert involves providing a tool holder where the insert seat is sufficiently inclined with respect to the rotary axis of the tool holder that the cutting edge has the required positive axial rake angle. It will be readily understood that constructional considerations limit the degree of inclination of the support seat in the tool holder, seeing that an excessively high inclination would of necessity weaken the tool holder. Thus, with conventional rotary milling cutters, an upper limit was always imposed on the magnitude of the axial rake angle.

It was with a view to overcoming this restriction that it was proposed, for example in our prior U.S. Pat. Nos. 5,052,863 and 5,071,292, to provide the insert with a cutting edge which is inclined with respect to the base surface of the cutting insert. By so doing it is possible, On the one hand, to achieve an increased positive axial rake angle and, on the other hand, to maintain the insert support seat of the tool holder in a more or less conventional inclination, thereby not leading to the structural weakening of the tool holder. This solution, however, is limited by the size of the insert. Thus, the angle of inclination of the cutting edge vis-à-vis the base of the insert is a function of the ratio of the height of the insert to the length of the cutting edge. Thus, the longer the cutting edge, any increase in the angle of inclination or the cutting edge must be accompanied by a corresponding increase in the height of the insert.

It has furthermore been previously proposed, in our U.S. Pat. Nos. 5,158,402 and 5,232,319, to produce a cutting insert for use with a rotary milling cutting tool wherein the cutting edge includes a plurality of successive component cutting edges respectively merging via intermediate edges. These two prior U.S. patent specifications both disclose, with respect to FIGS. 9 thereof, a milling cutting insert having such component cutting edges, all of which present significant positive axial rake angles. However, as is clear from these figures and the associated description, each intermediate edge is directed from the trailing extremity of the immediately-preceding component cutting edge towards the base edge of the insert and, in this way, as can be seen, the insert is of progressively decreasing thickness (or height) as one proceeds from the leading to the trailing end thereof. It is therefore clear that, with such a construction, the magnitude of the positive axial rake angle which can be achieved is limited, seeing that any increase thereof would require a corresponding increase in the height of the insert. Furthermore, it is clear that the number of component cutting edges is limited, thereby limiting the length of the overall cutting edge of the insert. Thus, effectively, the prior proposal does not provide an effective solution to the problem of providing a milling cutting insert with a significantly higher axial rake angle whilst, at the same time, maintaining the same constructional requirements for the insert as a whole.

It is an object of the present invention to provide a new and improved milling cutter insert which, when mounted on the rotary cutter tool, presents a substantially increased positive axial rake angle, but wherein the disadvantages referred to above with known milling cutting inserts and their associated cutting tools, are substantially reduced.

BRIEF DESCRIPTION OF THE INVENTION

According to the present invention, there is provided a cutting insert for use with a rotary milling cutting tool and having a cutting edge defined between a cutting rake surface and a relief flank, and having a base edge defined between said relief flank and a base surface, the cutting edge consisting of a plurality of successive component cutting edges and intermediate edges respectively located between successive component cutting edges; each component cutting edge having respective leading and trailing extremities and being directed, from its leading extremity, towards said base edge, each leading extremity other than that of a first leading component cutting edge merging with an immediately preceding trailing extremity via an intermediate edge which is directed from said trailing extremity away from said base edge.

Thus, with a milling cutting insert in accordance with the present invention, it is possible to produce a series of successive component cutting edges, each of which presents, when the insert is mounted in the cutting tool, a much higher positive axial rake angle than could be achieved previously, and this without introducing undue limitations, either with respect to the dimensions of the cutting insert itself or undesirable requirements concerning the inclination of the insert seating of the cutting tool.

Preferably, each normal to an axis of rotation of the cutter tool which passes through a trailing extremity of one component cutting edge, intersects the successive component cutting edge so that during a milling operation, successive component cutting edges overlap. In this way, it is ensured that the successive component cutting edges respectively produce effectively separate chips of relatively low width.

Preferably, and as described in our EP 0 566 085 A1, the component cutting edges of the insert in accordance with the present invention are designed to lie on a cylindrical envelope corresponding to a predetermined optimal milling diameter. In this way, it is ensured that the milled surface corresponding to this optimal diameter is minimally distorted Alternatively, only the leading extremities of the component cutting edges are designed to be on such an envelope.

BRIEF DESCRIPTION OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
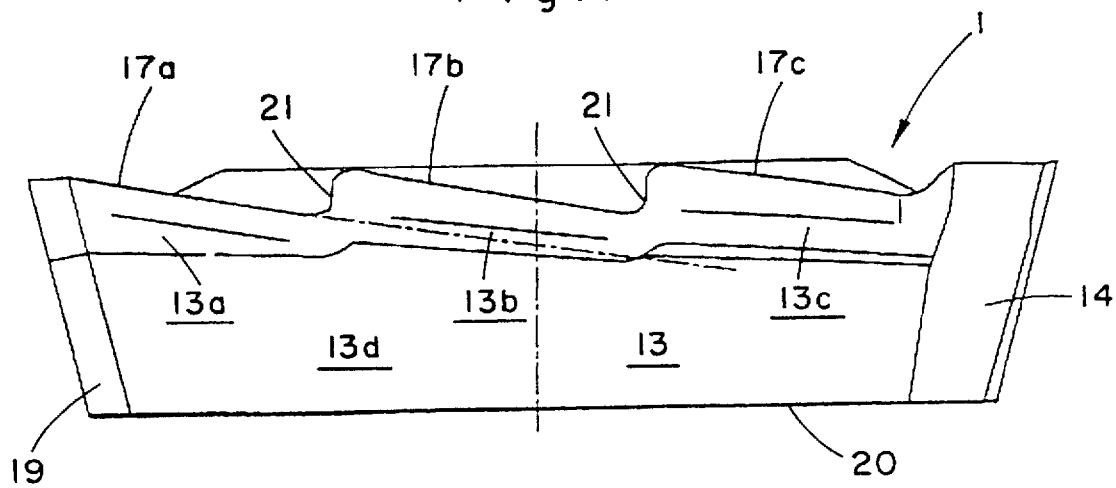
FIG. 1 is a side elevation of a cutting insert in accordance with the present invention.
Figure 2:
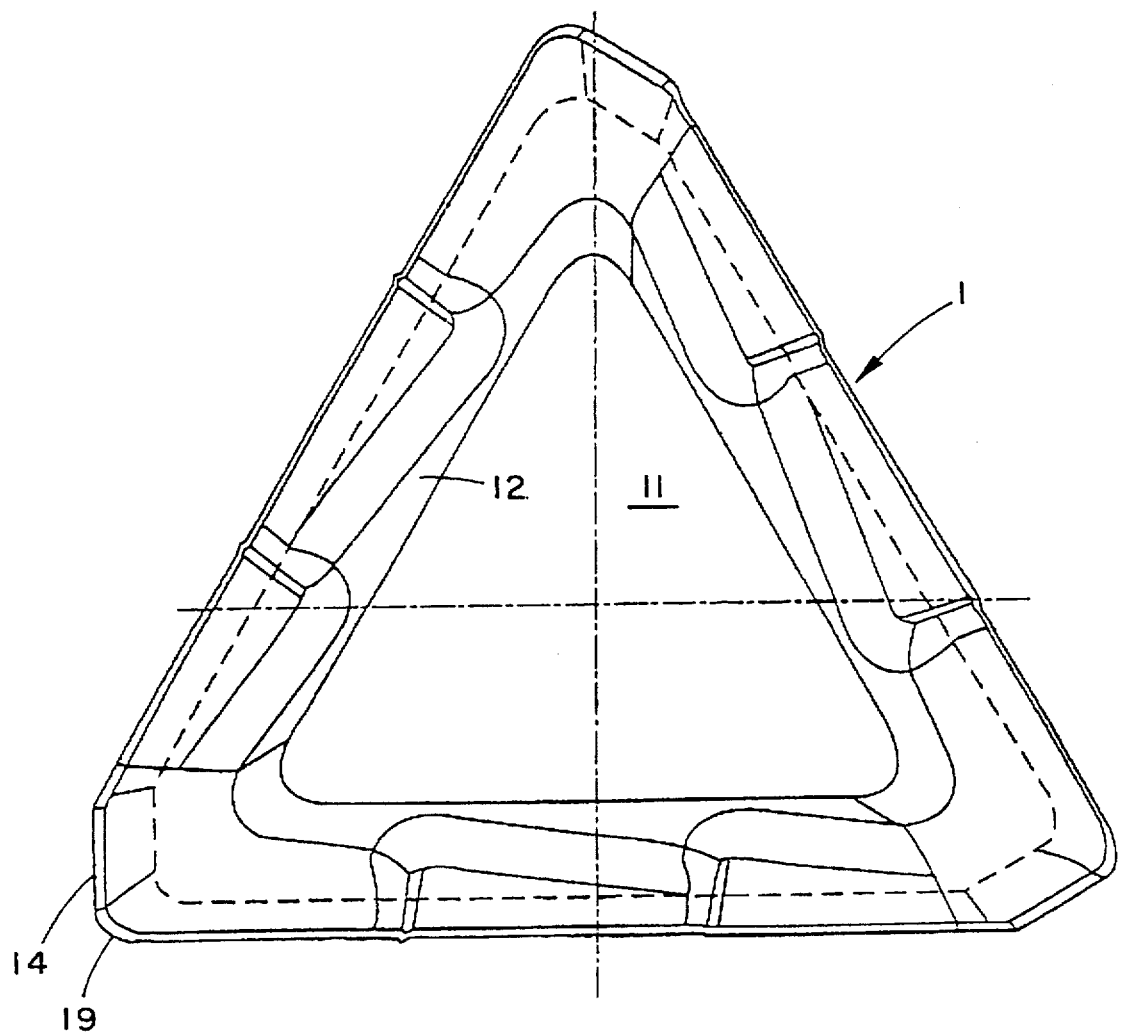
FIG. 2 is a plan view from above of the cutting insert shown in FIG. 1.

As seen in the drawings, a cutting insert 1 (which, in the present embodiment, is of substantially triangular shape and is preferably formed of tungsten carbide) has a central, upper planar surface 11 surrounded by a peripheral, upper cutting rake surface 12. The insert is formed with a planar base surface (not seen) which is parallel to the central, planar surface 11. The insert is further formed with relief flanks 13 and, at the corners 19, with wipers 14 of conventional construction. Each relief flank 13 is formed with three upper component relief flanks 13a, 13b, 13c and with a lower, common, planar relief flank portion 13d.

Defined respectively between the component relief flanks 13a, 13b, 13c and the upper, cutting rake surface 12, are three component cutting rake edges 17a, 17b, 17c, The upper component flanks 13a, 13b, 13c can, if desired, be formed of angularly disposed longitudinally directed portions.

A leading component crating edge 17a merges at its trailing extremity with the succeeding component cutting edge 17b via an intermediate edge 21 which is directed from the trailing extremity of the preceding component cutting edge towards a base edge 20 of the insert. Similarly, the component cutting edge 17b merges with the succeeding component cutting edge 17c via an intermediate edge 21 which is also directed from the trailing extremity of the preceding component cutting edge 17b away from the base edge 20. In consequence, and as can be seen, all the component cutting edges 17a, 17b, 17c are directed from their respective leading extremities towards the base edge 20.

The curved construction of the upper component relief flanks 13a, 13b, 13c and the corresponding curved construction of the rake surfaces, can be similar to those disclosed in our prior U.S. Pat. No. 5,158,402, whose contents are hereby incorporated by way of reference. Alternatively, the upper relief flanks 13a, 13b, 13c can be of substantially planar construction.

Figure 3:
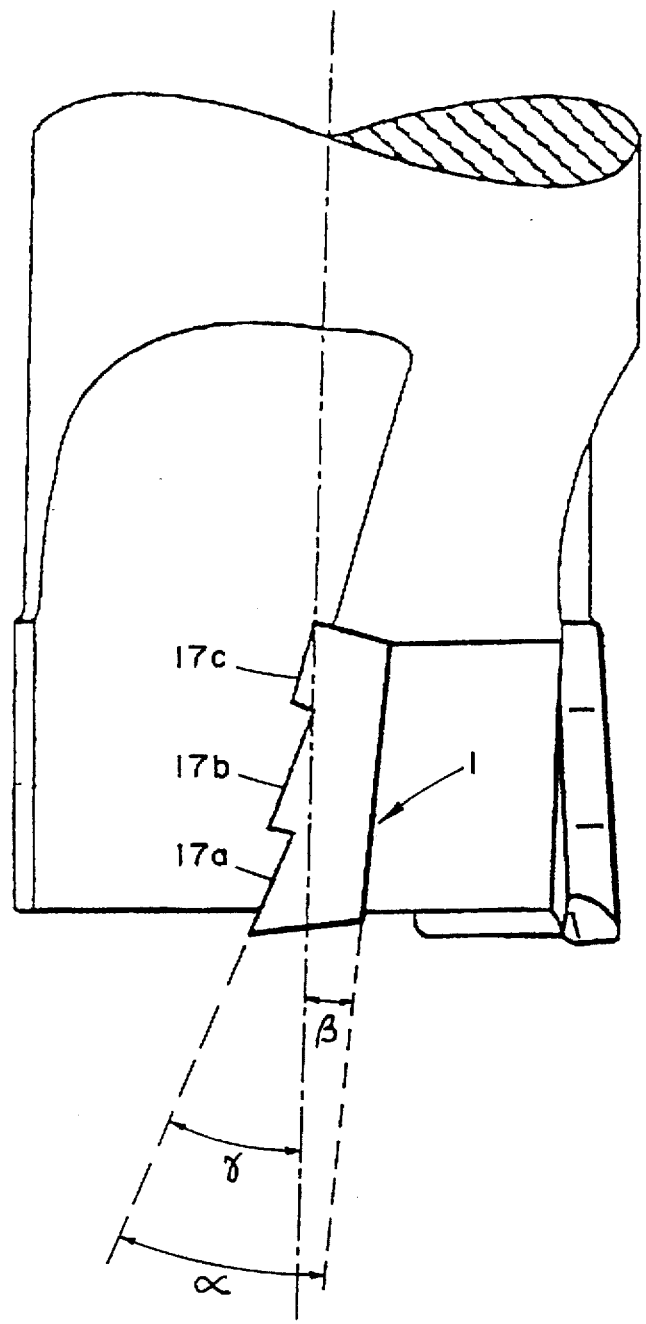
FIG. 3 is a side elevation of a milling cutting tool incorporating a cutting insert as shown in FIGS. 1 and 2 of the drawings.

As can be readily seen from FIG. 3 of the drawings, all three component cutting edges present highly positive, axial rake angles which, in the illustrated embodiment, are all substantially equal whilst the component cutting edges are all of substantially equal lengths. However these angles, whilst all being highly positive, are not necessarily equal whilst the respective lengths of the component cutting edges need not necessarily be equal.

Thus, the component cutting edges may be inclined with respect to the base edge of the insert by an angle α which should not be less than 2° (preferably in the range 2°–12°). Where the insert is mounted, as shown in FIG. 3 of the drawings, with the base edge inclined with respect to the longitudinal axis of rotation by an angle β which should not be less than 2° (preferably in the range 2°–9°), the resulting positive axial rake angle γ of the component cutting edges should not be less than 4° (preferably within the range 4°–21°).

A preferred range for α where all the angles are equal is 8°–10°.

In all circumstances, the provision of these component cutting edges with their highly positive axial rake angles is not accompanied by the steadily reducing width (and consequent constructional weakening of the insert) as described with reference to FIG. 9 of our prior U.S. Pat. Nos. 5,158, 402 and 5,232,319 and, in this way, it is ensured that the provision of such component cutting edges is achieved within the framework of inserts of standard dimensions. The insert in accordance with the invention is particularly useful with low diameter milling tools. Additionally, the particular shape and direction of the component cutting edges leads to an improved distribution of forces—i.e. increased axial forces and reduced radial tantial forces.

Furthermore, the achievement of such component cutting edges with highly positive axial rake angles is not at the expense of the provision of insert seatings in the cutting tool, which are so unduly inclined as to result in the weakening of the tool holder as a whole. Similarly, and as distinct from the prior art cutting insert where the cutting edge is inclined with respect to the base edge, the positive axial rake angle obtained with the cutting insert in accordance with the present invention is not in any way limited by the ratio of the height (thickness) of the cutting insert to the overall length of the cutting edge.

In addition to the distinct advantages of being able to provide a milling cutting insert having cutting edges of significantly increased axial rake angles, the division of the cutting edge into component cutting edges, on the one hand, and the fact that the projection of such a cutting insert on the cylindrical envelope of the milled surface is significantly less than the corresponding projection of a standard cutting insert where the high positive axial rake angle is achieved by providing a correspondingly inclined insert base surface, on the other hand, results in the milled surface which is obtained being substantially smoother (less distorted) than that obtained with such a conventional insert.

Whilst, in accordance with the embodiment specifically described, the insert has been shown as having three component cutting edges, inserts having other numbers of component edges can equally well be employed, as can inserts wherein the component cutting edges do not all present substantially equal axial rake angles but which are all nevertheless of highly positive axial rake angles.

Furthermore, the Invention is equally applicable to inserts of shapes other than the triangular shape specifically illustrated, such as, for example, rectangular, square or trigon.

Figure 4:
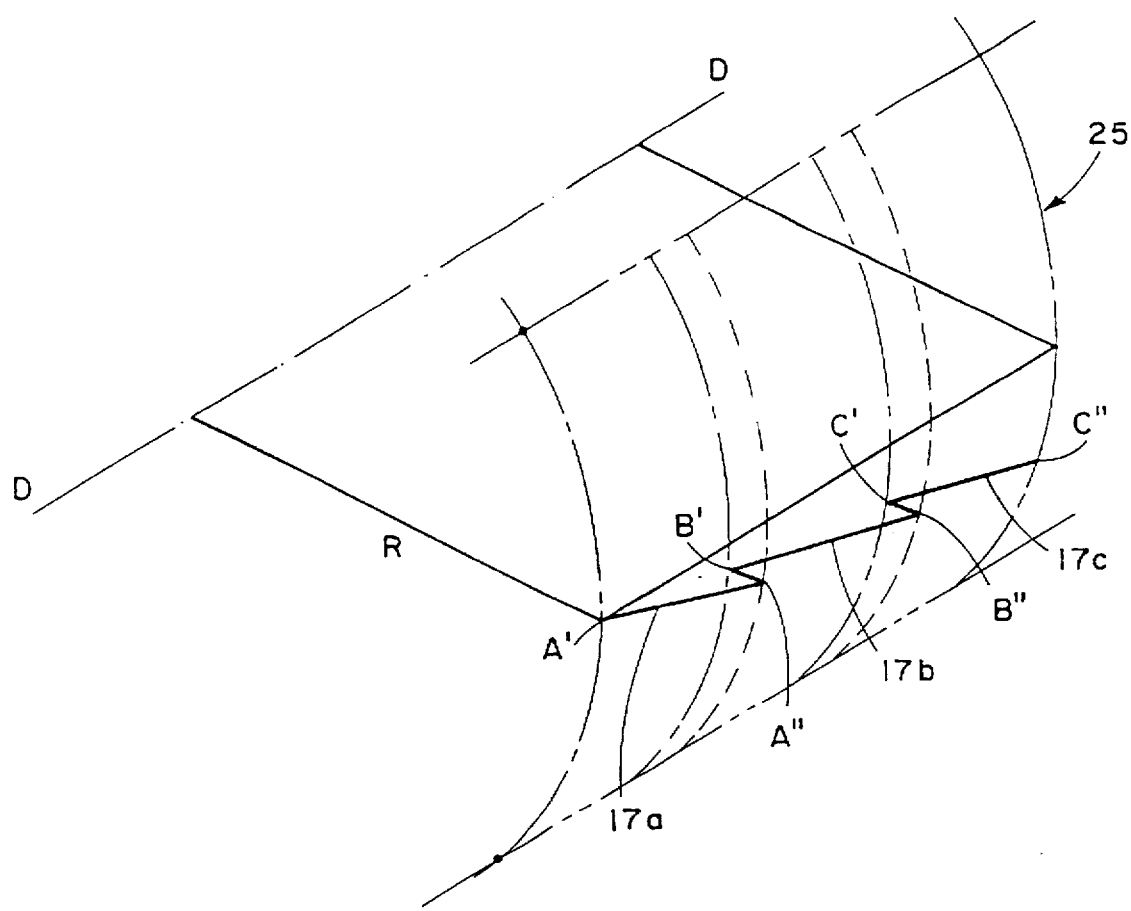
FIG. 4 is a schematic view showing the component cutting edges tracing out a cylindrical envelope.

As shown in FIG. 4, the component cutting edges 17a, 17b and 17c can be designed to have their leading extremities lie on a cylindrical envelope 25 having a rotary axis D—D and preferred milling diameter R. As also shown in this figure, all of the component cutting edges, respectively defined by segments A'A", B'B" and C'C", substantially lie on this cylindrical surface.

Furthermore, by ensuring that the component cutting edges are designed to lie on a cylindrical envelope corresponding to a predetermined optimal milling diameter, this ensures that the milled surface corresponding to this optimal milling diameter (or close thereto) is minimally distorted.

We claim:

1. A rotary milling cutter tool having a tool holder with a leading end and a cutting insert mounted in the tool holder, said insert having a cutting edge defined between a cutting rake surface and a relief flank, and having a base edge defined between said relief flank and a base surface, the cutting edge comprising a plurality of successive component cutting edges and intermediate cutting edges respectively located between successive component cutting edges; each component cutting edge having respective leading and trailing extremities defined with respect to said leading end and being directed from its leading extremity towards said base edge, each leading extremity other than that of a first leading component cutting edge merging with an immediately preceding trailing extremity via an intermediate edge which is directed from said trailing extremity away from said base edge.

2. A cutting insert according to claim 1, wherein each normal to an axis of rotation of the cutter tool which passes through a trailing extremity of one component cutting edge, intersects the successive component cutting edge so that during a milling operation, successive component cutting edges overlap.

3. A cutting insert according to claim 1 or 2, wherein the component cutting edges are inclined with respect to a base edge of the insert by angles α which are not less than 2°.

4. A cutting insert according to claim 3, wherein the angle α lies in a range from 2°–12°.

5. A cutting insert according to claim 4, wherein the angle α lies in a range from 8°–10°.

6. A cutting insert according to claim 4, wherein said component cutting edges are of substantially equal length.

7. A cutting insert according to claim 6, wherein at least the leading extremities of the component cutting edges are designed to be on a cylindrical envelope corresponding to an optimal milling diameter.

8. A cutting insert according to claim 7, wherein said component cutting edges are designed to lie on said cylindrical envelope.

9. A rotary milling cutter tool comprising a tool holder with a leading end and a cutting insert having a cutting edge and a wiper edge disposed adjacent said leading end of the tool holder and associated with a leading end of said cutting edge via an insert corner;

said cutting edge comprising a plurality of successive component cutting edges and respective intermediate edges located therebetween, each component cutting edge extending from its leading extremity to its trailing extremity and being directed away from said corner and towards the insert base; and the leading extremities of the component cutting edges other than that adjacent said insert corner merging with immediately preceding trailing extremities via respective intermediate edges which are directed away from said insert base.

10. A cutting insert according to claim 9, wherein said intermediate cutting edges are directed away from said insert base at obtuse angles.

11. A cutting insert according to claim 9, wherein said component cutting edges are directed towards the insert base at equal acute angles.

12. A cutting insert according to claim 9, wherein said component cutting edges are inclined with respect to the insert base by angles α which are not less than 2°.

13. A cutting insert according to claim 12, wherein the angle α lies in a range from 2°–12°.

14. A cutting insert according to claim 13, wherein the angle α lies in a range from 8°–10°.

15. A cutting insert according to claim 9, wherein said component cutting edges are of substantially equal length.

16. A cutting insert according to claim 9, wherein at least the leading extremities of the component cutting edges are designed to lie on a cylindrical envelope corresponding to an optimal milling diameter.

17. A cutting insert according to claim 16, wherein said component cutting edges are designed to lie on said cylindrical envelope.

* * * * *